M. J. DAWKINS.
Making Wheels.
No. 81,883.
Patented Sept. 8, 1868.
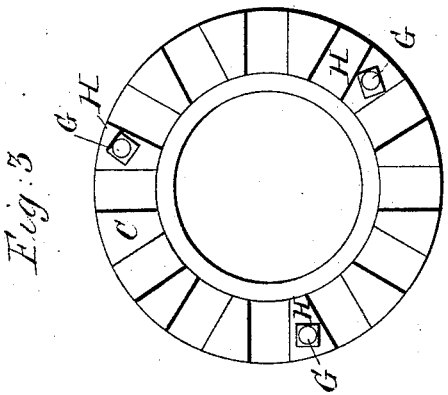
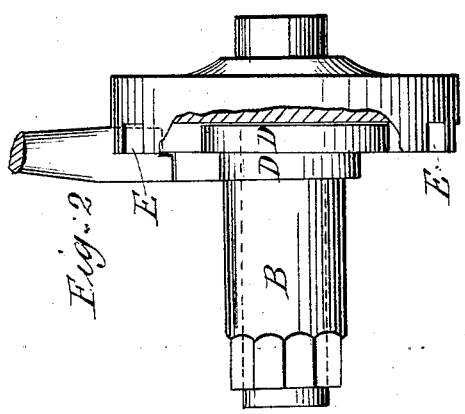
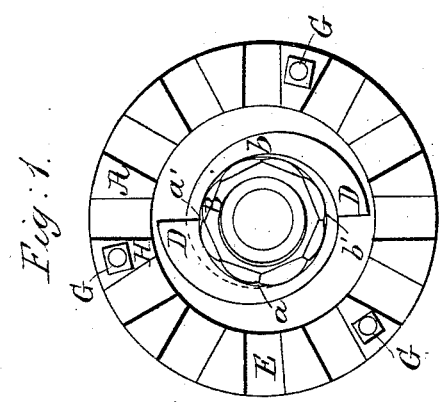
Witnesses
Inventor.
Malt J. Dawkins

UNITED STATES PATENT OFFICE.

MATT. J. DAWKINS, OF BROOKSTON, INDIANA.

IMPROVEMENT IN THE CONSTRUCTION OF WAGON AND CARRIAGE WHEELS.

Specification forming part of Letters Patent No. 81,883, dated September 8, 1868.

*To all whom it may concern:*

Be it known that I, MATT. J. DAWKINS, of Brookston, in the county of White and State of Indiana, have invented a new and useful Method of Setting Wheels to Tires; and I do hereby declare that the following is a clear, exact, and full description thereof, reference being had to the accompanying drawings, forming part of this specification, in which—

Figure 1 is the front or inside view of the back part of the centrally-divided hub, together with the main box through which the spindle passes. Upon said box is also adjustably fitted a thimble. Fig. 2 is a side view of the thimble, with double cams cast solid on one end thereof, the other end of octagonal form. Fig. 3 is the front part of the hub, which is fitted over the thimble, against the back part of said hub, and pressing upon the spokes, both parts of the hub being secured by bolts passing through them and held securely by nuts. Fig. 4 is a side view of the spokes. Fig. 5 is an end and lower view of the spoke as resting upon the cam.

A designates the back part of the hub, with main box attached. B is the thimble. C is the front part of the hub. D D are the cams on the thimble. E E are the sockets. F is the lower part of the spoke. G is the bolt, and H is the nut.

The operation of the adjustment of the wheel to the tire is as follows: All the parts being put in proper position, with spokes being inserted into the back part of the hub and resting against the cam, the tire is fitted loosely around the spokes. The wrench is then applied to the octagonal part of the thimble, and turned in the proper directions, thereby expanding radially the spokes, by means of the cams, against or into the rim of the wheel until the spokes fit tightly, the two parts of the hub being then bolted tightly together, and the wheel is ready for use.

Suppose we pass spoke $a$ to the position $a'$, and $b$ to $b'$, and in like manner will the balance of the spokes be adjusted until all fit uniformly and tightly into the rim. By this means, it will be seen that the shrinking of the tire is dispensed with. It keeps the wheel constantly tight, it is easily adjusted, will not rattle, is cheaply manufactured, and the danger of the tire becoming detached is avoided.

What I claim as new, and desire to secure by Letters Patent, is—

1. Setting or adjusting the wheel, with the spokes inserted therein, to the tire by means of cams cast onto a thimble, said cams being located within the hub and their faces bearing against the spokes, substantially as described and set forth.

2. The hub made in three parts—viz., the back part, with the main box cast in one piece, the front part, and the thimble, with cams cast thereon.

3. The step-shaped form on the lower part of the spoke, which rests against the cams.

4. In combination with the foregoing, the tapering sockets in the centrally-divided hub, substantially as described.

MATT. J. DAWKINS.

Witnesses:
EDM. F. BROWN,
H. M. STOW.